US008866813B2

(12) United States Patent
Armsden et al.

(10) Patent No.: US 8,866,813 B2
(45) Date of Patent: Oct. 21, 2014

(54) POINT-BASED GUIDED IMPORTANCE SAMPLING

(75) Inventors: Chris F. Armsden, Burbank, CA (US); Bruce Tartaglia, Santa Monica, CA (US)

(73) Assignee: DreamWorks Animation LLC, Glendale, CA (US)

( * ) Notice: Subject to any disclaimer, the term of this patent is extended or adjusted under 35 U.S.C. 154(b) by 667 days.

(21) Appl. No.: 13/174,385

(22) Filed: Jun. 30, 2011

(65) Prior Publication Data

US 2013/0002671 A1 Jan. 3, 2013

(51) Int. Cl.
*G06T 15/50* (2011.01)
*G06T 17/00* (2006.01)
*G06T 15/06* (2011.01)

(52) U.S. Cl.
CPC ............. *G06T 15/06* (2013.01); *G06T 15/50* (2013.01); *G06T 17/00* (2013.01); *G06T 2210/56* (2013.01)
USPC ........................................................ 345/426

(58) Field of Classification Search
CPC .................................................. G06T 15/506
See application file for complete search history.

(56) References Cited

U.S. PATENT DOCUMENTS

| 6,489,955 | B1* | 12/2002 | Newhall, Jr. ................... 345/419 |
|---|---|---|---|
| 2005/0264564 | A1 | 12/2005 | Keller |
| 2005/0278406 | A1 | 12/2005 | Keller |
| 2006/0066616 | A1 | 3/2006 | Sevastianov et al. |
| 2007/0018980 | A1* | 1/2007 | Berteig et al. ................. 345/426 |
| 2008/0143720 | A1 | 6/2008 | Elmquist |
| 2009/0027390 | A1* | 1/2009 | Bin Zafar et al. ............. 345/426 |
| 2010/0079452 | A1 | 4/2010 | Zhou et al. |
| 2010/0188396 | A1 | 7/2010 | Mejdrich et al. |
| 2012/0154401 | A1* | 6/2012 | Chauvier et al. .............. 345/426 |
| 2012/0313944 | A1* | 12/2012 | Kontkanen et al. ........... 345/426 |

OTHER PUBLICATIONS

Christensen, Per H., "Point-Based Approximate Color Bleeding", Pixar Technical Memo #D8-01, 9 pages.
Jensen, Henrik W., "Importance Driven Path Tracing using the Photon Map", Department of Graphical Communication, Technical University of Denmark, 11 pages.
Cook, Robert L., "Stochastic Sampling in Computer Graphics", ACM Transactions on Graphics, vol. 5, No. 1, Jan. 1986, pp. 51-72.
Gross et al., "Point-Based Graphics", The Morgan Kaufmann Series in Computer Graphics, 2007, 67 pages.
Jensen et al., "A Practical Guide to Global Illumination using Photon Mapping", Siggraph 2002, Course 43, July 23, 2002, 60 pages.

(Continued)

*Primary Examiner* — Edward Martello
(74) *Attorney, Agent, or Firm* — Morrison & Foerster LLP

(57) ABSTRACT

A computer-animated scene illuminated by indirect light is shaded. The scene is comprised of sample locations on a surface element of an object in the scene. A point cloud representation of the scene is generated. Optionally, an importance map of the scene, based on the point cloud representation, is generated. The importance map is generated by rasterizing one or more points in the point cloud and designating areas of interest based on the energy value of the one or more points in the point cloud. A ray tracing engine is biased, based on the importance map. The biased ray tracing engine calculates the path of the ray to the sample locations in the scene to an area of interest. The scene is shaded using the output from the biased ray tracing engine.

29 Claims, 7 Drawing Sheets

(56) References Cited

OTHER PUBLICATIONS

Agarwal et al., "Structuted Importance Sampling of Environment Maps", ACM SIGGRAPH Conference Proceedings, 2003, pp. 1-8.

Jensen, Henrik W., "Global Illumination using Photon Maps", Abstract for Dagstuhl Seminar on Rendering, 1996, 1 page.

Jensen, Henrik W., "Global Illumination using Photon Maps", Proceedings of the Seventh Eurographics Workshop on Rendering, 1996, pp. 1-17.

"Global Illumination", Available at: <http://www.hradec.com/ebooks/CGI/RMS_1.0/Recipes_and_Tutorials/Global_Illumination.html>, Retrieved on Dec. 13, 2010, pp. 1-10.

\* cited by examiner

POINT-BASED GUIDED IMPORTANCE SAMPLING

BACKGROUND

1. Field

This application relates generally to computer graphics, and more specifically to computer systems and processes for efficiently rendering a scene illuminated by indirect light using ray tracing.

2. Related Art

Rendered images used in high quality motion pictures need to be of high quality. Global illumination is a technique used in computer graphics to add more realistic lighting to the scenes. Global illumination takes into account not only the light that comes directly from the light sources placed in the scene (direct illumination), but also light rays that are reflected by other surfaces in the scene (indirect illumination). For example, with direct illumination alone, shadows appear black, because there is no direct illumination in the shadowed areas. By contrast, global illumination allows light to bounce around in the scene before it is finally reflected towards the virtual camera. As a result, details in the shadowed areas may be seen as well.

Traditionally, global illumination is computed using a technique known as the Monte-Carlo ray tracing approach (also known as distributed ray tracing). Path-tracing is a technique which uses this Monte-Carlo approach to generate an image by tracing the path of rays from a virtual camera through pixels in an image plane and then into the scene. Each ray is tested for intersection with the objects in the scene. If a ray hits a surface, the ray tracing algorithm traces through the reflected and/or refracted rays in addition to rays that sample the scene to capture secondary lighting effects, all of which may hit other surfaces in the scene. By recursively tracing all of these rays, a high degree of photorealism may be obtained. At each ray intersection a shading operation may be performed in order to evaluate the correct color contribution due to that intersection.

Monte-Carlo methods use repeated, random sampling to determine a probabilistically likely result. Another Monte-Carlo ray tracing technique—gathering (also known as final gathering)—uses stochastic sampling to randomly send rays out in a hemisphere around a particular location to determine the incoming illumination to that location. This determination is also known as the illumination integral. This method reduces the complexity of sending out an infinite number of dependent reflected and/or refracted rays.

Some scenes are illuminated only by a small amount of indirect lighting. To accurately compute the indirect illumination, these scenes require several orders of magnitude more sample rays to adequately determine the amount of incoming light energy (irradiance) of each sample location without significant background "noise", which in computer graphics applications may result in the unrealistic and unwanted rendering of illumination. FIGS. 5A-B show examples of a scene illuminated by a small amount of indirect light, resulting in noisy illumination, which may be characterized by spotty shading, non-uniform shading, non-photorealistic shading, low quality shading, or the like. To improve the quality of the image and decrease the noise, orders of magnitude more rays are required to sample the scene.

Global illumination may also be computed using an approach known as photon mapping. In photon mapping, discrete particles of energy, called photons, are emitted from light sources and bounce around the scene. When the photons interact with surfaces within the scene, some of the photons' energy is deposited on the surface. The energy deposits are stored, or mapped, in a structure known as a photon map. The path of the photon is followed until the photon's energy dissipates. This method is very computationally intensive: large numbers of photons are required to adequately sample a scene. Further, photons may interact with surfaces outside the view of the camera, such as those sample locations occluded by other objects in the scene, resulting in unnecessary, time-consuming computation. Finally, the distribution of photons within the scene may be irregular. Many photons may interact with lower energy surfaces, while higher energy surfaces may interact with fewer photons.

Another global illumination approach is known as the point-based global illumination (PBGI) approach. (See Per H. Christensen, "Point-based approximate color bleeding," *Pixar Technical Memo* #08-01 (July 2008), hereinafter referred to as "Christensen 2008.") PBGI involves solving for the indirect illumination integrals and occlusion integrals. Before these integrals are solved, the directly illuminated geometry in the scene is represented by a point cloud representation, which is generated in a pre-computation phase prior to the rendering of the scene.

A point in a point cloud is a position in three dimensional space containing energy information. In one example, a point may be a data representation of a surfel, which is a small circular disk-shaped surface element making up the different objects within a scene. As described in Christensen 2008, the surfaces of different objects are subdivided into small micropolygons, and the light energy emitting (which may include reflected energy) from each micropolygon (e.g., the radiance) is stored with each point. A point can also store other information, including a position, a surface normal, an effective area, a point-radius, and the like. As described in Christensen 2008, the effective area and the point-radius stored in a point are not the same thing; rather, they are two different representations of the size of the point. The point-radius circumscribes the micropolygon that the point represents. This ensures that the surfaces are completely covered by the points with no gaps in between. The effective area is the point's real area, which is smaller than the area corresponding to the point-radius.

Rendering dynamic scenes in low lighting, illuminated only by a small amount of indirect light, is particularly difficult. Using Monte-Carlo ray tracing, photon mapping, or PBGI alone to determine the indirect lighting in these scenes has negative side effects. First, to compute the lighting of a scene using Monte-Carlo ray tracing, and ensure high quality without excessive noise, requires many orders of magnitude more rays than required for well-lit scenes. Calculating the paths of these additional rays significantly increases the computation time required to render a scene. Second, computing the lighting of a scene with photon mapping is extremely computationally intensive, requiring many photons and extraneous computations. Third, using PBGI may result in artifacts that are not pleasing to the eye due to the coarseness of the micropolygons.

SUMMARY

In one exemplary embodiment, a computer-animated scene illuminated by indirect light is shaded. The scene is comprised of sample locations on a surface element of an object in the scene. The surface element lies at least partially within a camera viewing frustum of a virtual camera. A point cloud representation of the scene is generated by dividing the surface of the object in the scene into one or more micropolygons and storing the position, area, radius and normal value of each micropolygon with its corresponding point. The point may have an associated energy (radiance) value also if the point cloud is being used for illumination.

An importance map may be generated at each sample location by rasterizing a cube or hemi-cube view of the point cloud from the position of the sample location, orientated around the normal to the sample location. This raster image may determine the energy incoming (irradiance) to the sample location. One or more areas of interest may then be designated based on the absolute or relative irradiance. Using this information, a ray tracing engine may then be biased, "sending" rays in the directions of areas of interest. For example, the areas of interest may be the areas of highest or relative energy, radiance, light, or the like in the scene. The scene is shaded using the output from the biased ray tracing engine.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
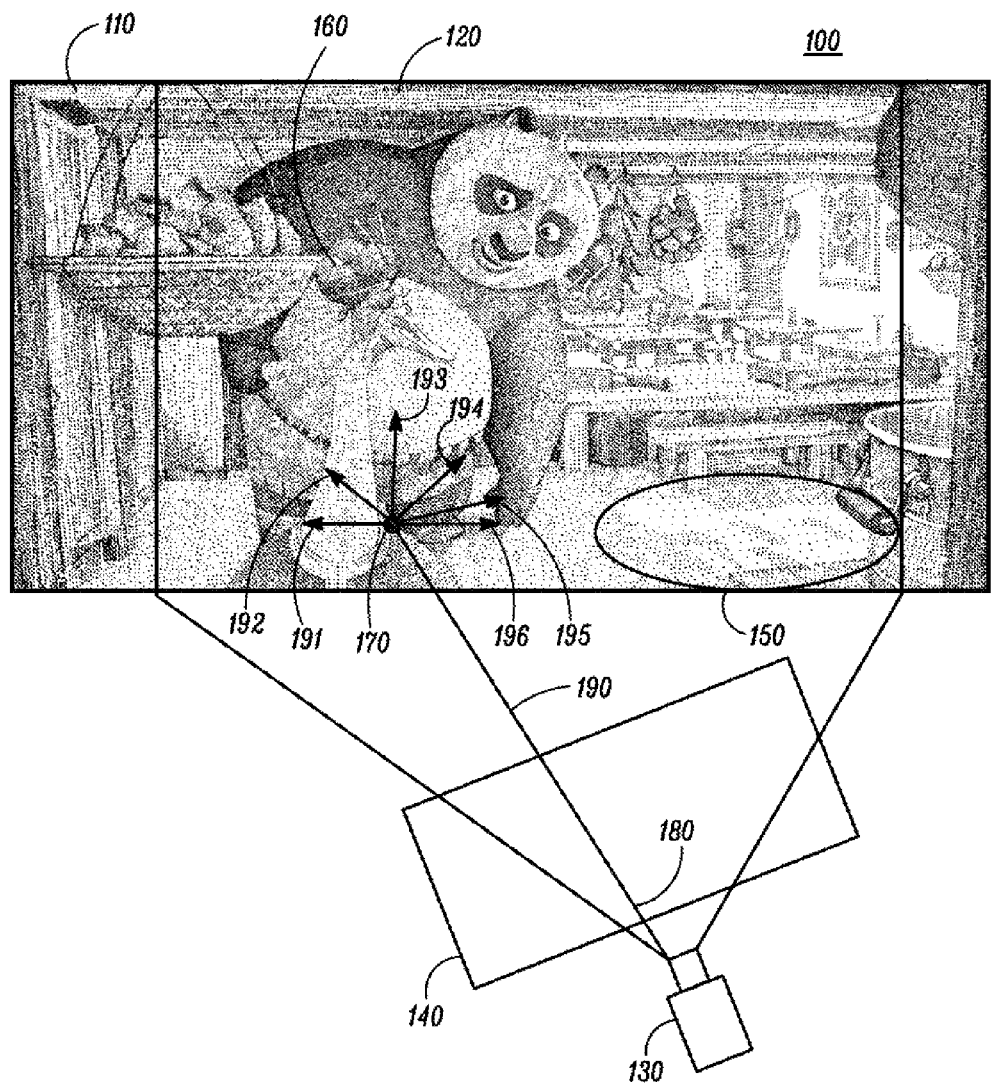
FIG. 1 illustrates an exemplary scene lit by indirect lighting.

FIG. 1 illustrates an exemplary scene 100 lit by indirect lighting 150. The scene 100 may be a snapshot taken by a virtual camera 130, viewing a virtual world 110. The box 120 highlights the portion of the virtual world 110 that may be visible to the virtual camera 130. Indirect lighting 150 may be light from an out-of-view light source, such as a light bulb, the sun, or the like. The scene 100 may be rendered using a conventional ray tracing engine.

A snapshot of a scene 100 using a ray tracing approach may be rendered by calculating the path of rays from a virtual camera 130 through pixels in an image plane 140 and then into the virtual world 110. For example, consider ray 190. Ray 190 originates at virtual camera 130, passing through the image plane 140 at pixel 180. The ray 190 enters the virtual world 110 and encounters its first object 160 at sample location 170. In this way, the rendered pixel 180 on the image plane 140 may be associated with the shaded sample location 170 in the virtual world 110. In one embodiment, only sample locations within the box 120 may be associated with pixels on the image plane 140 since only these locations are visible to the virtual camera 130. However, sample locations anywhere within the virtual world 110 may affect the shading, or color, of sample locations within the box 120.

When determining the shading of a sample location 170 on an object 160 in the scene 100 as a result of indirect lighting 150, ray 190 is reflected and/or refracted into rays 191-196. These rays 191-196 are sent out from the sample location 170 using a stochastic sampling method and are randomly distributed in a hemisphere around the sample location 170. These rays 191-196 sample the surrounding geometry of the scene 100 and then are integrated to determine the incoming illumination, or irradiance, of the sample location 170.

Many of the rays 191-194 are sent away from the indirect light 150 and so contribute no irradiance to the final rendering of the sample location 170. Irradiance is a measure of the amount of light energy incoming or incident to a surface. Color is a specific frequency of this light energy. For example, the color perceived as red has a particular frequency whilst the color perceived as blue has another. In this example, only two of the rays 195-196 are mostly directed toward the indirect light 150 and contribute irradiance to the final rendering of the pixel 180 associated with sample location 170. To achieve the quality necessary for aesthetic images, many orders of magnitude more rays are required to illuminate this scene than to illuminate a well-lit scene, since so many rays are sent away from the indirect light 150 and do not contribute.

Figure 2:
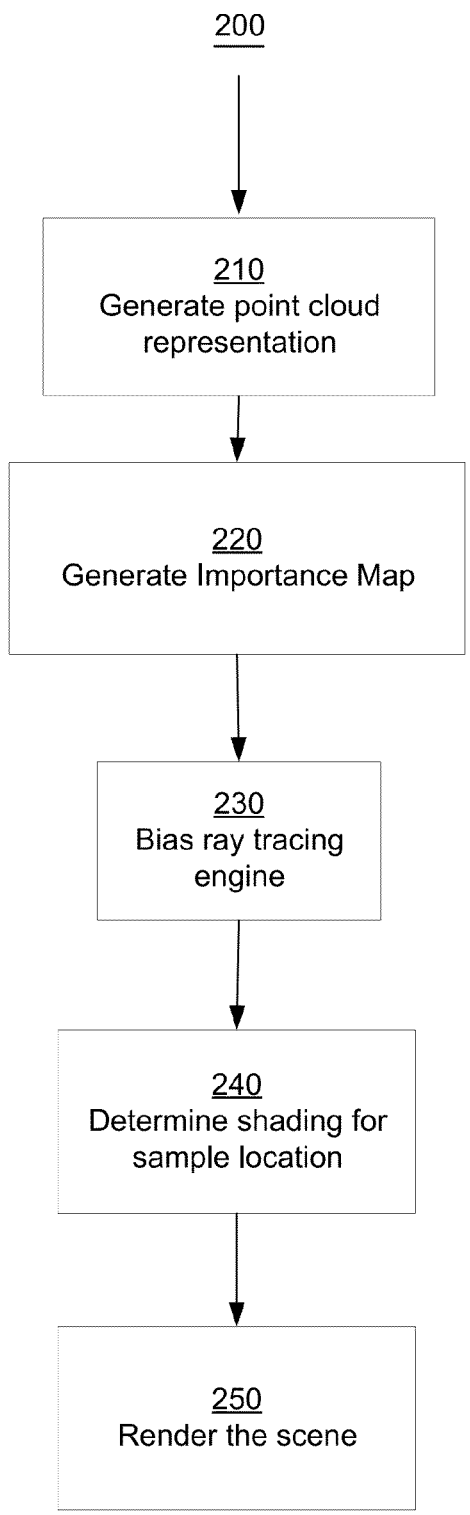
FIG. 2 illustrates an exemplary process for rendering a scene.

Accordingly, a process for shading a scene includes using a point cloud representation of a scene to identify areas of interest and to weight, or bias, a ray tracing engine based on the identification of those areas of interest. FIG. 2 illustrates an exemplary process 200 for rendering a scene. In step 210 of process 200, a point cloud representation of the scene is generated. A PBGI method, such as, for example, the one described in Christensen 2008, may be used to generate the point cloud.

Figure 3:
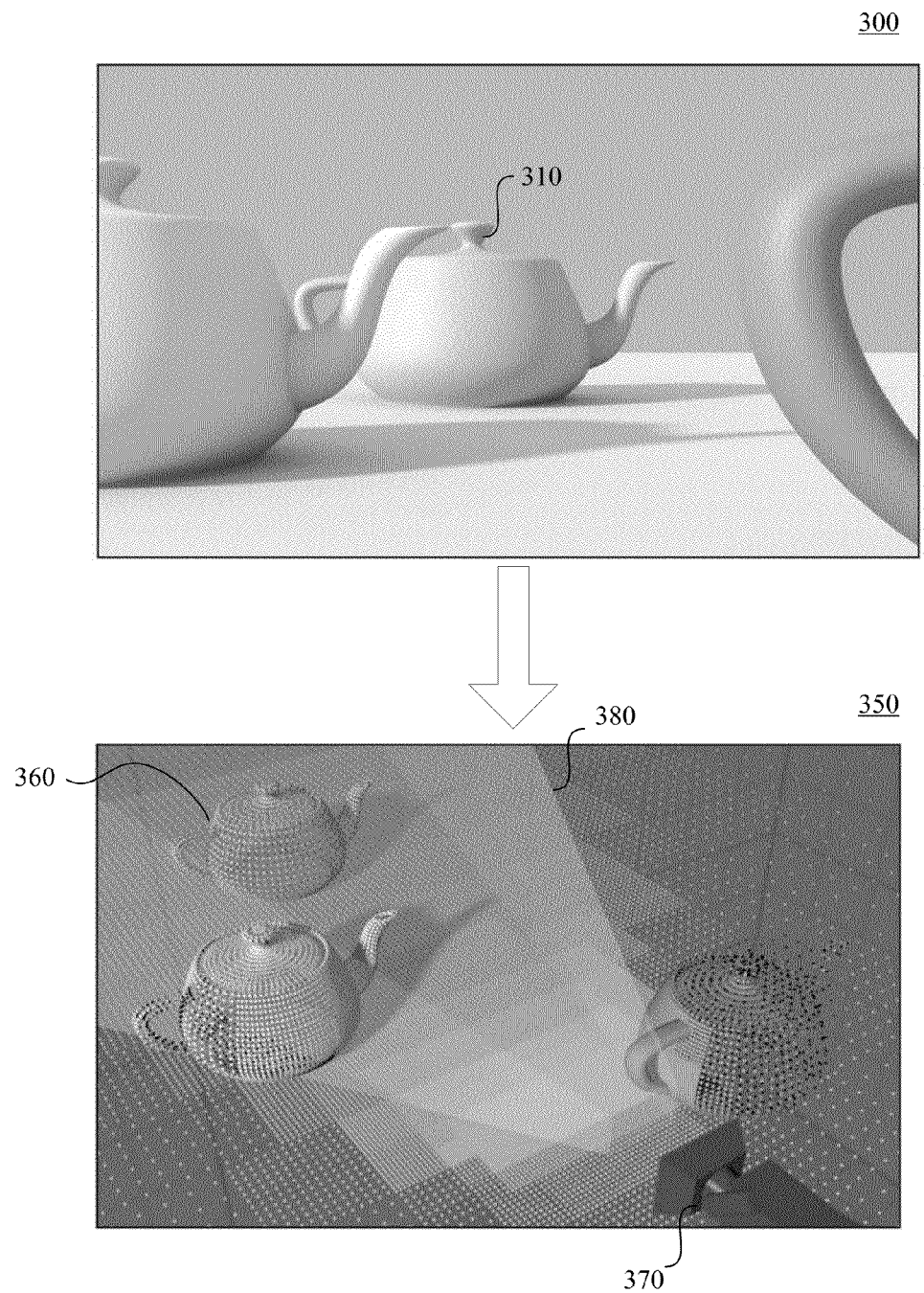
FIG. 3 illustrates an exemplary representation of generating a point cloud representation of a scene.

FIG. 3 provides one exemplary representation of generating a point cloud representation of a scene. Scene 300 may represent a snapshot taken by a virtual camera 370, viewing a virtual world of teapots, including teapot 310. A point cloud representation 360 of teapot 310 may be computed. To generate the point cloud, the surfaces of different objects in the scene 300, such as teapot 310, may be subdivided into small micropolygons. The energy from each micropolygon may be stored by a point in the point cloud. A point may also store other information, including a position, a surface normal, an effective area, a point-radius, ID, or the like.

The point cloud may be generated from the point of view of the virtual camera's 370 frustrum 380. This limits the number of points to those visible by the camera, removing any points outside the camera's field of view or occluded by other objects within the scene. The point cloud representation 350 of the scene 300 may be generated in a pre-computation phase before computing the shading of the pixels in the scene.

Referring again to FIG. 2, in step 220 of process 200, the importance map may be generated. In one embodiment, the point cloud representation may be rasterized at each sample location to generate a local importance map of the scene, relative to the sample location. Rasterization is the process of converting a vector graphics image into a raster image comprised of pixels for output on a display, storage in a file, or the like. The importance map may be generated during a pre-image-rendering computation phase, or a pre-pass.

The importance map may contain information including, but not limited to, the energy of the point, its position relative to the sample location, identification information, or the like. The ID information of the point in the point cloud may provide additional information regarding the geometry of the scene at that point. When the importance map is generated, the geometry of the scene may be used to provide further information to the ray tracing engine. In this way, speed and memory usage, for example, may be optimized by accounting for the local geometry of the scene. This information may also be used to designate one or more "areas of interest" in the scene. As used herein, "area of interest" refers to any area within a scene which may contribute information important to the illumination of the scene. For example, "area of interest" may include, but is not limited to, areas of high radiance, high contrast, relative contrast, or the like. Further, each scene may have zero or more areas of interest. These areas of interest may provide the greatest contributions to the shading of the scene.

The importance map may be built starting from the point cloud representation. In this embodiment, the points in the point cloud representation are clustered into point clusters, approximations of a collection of points situated within a particular volume. The points are then rasterized to a cube. The rasterized cube may include energy that passes through the sample location, accounting for volumetric effects. For example, energy may pass through sample locations on translucent objects, such as clouds, skin, hair, or the like. The rasterized cube may also account for multiple levels of indirect illumination, such as may be considered when rendering ice.

In one embodiment, the cube may be a hemicube. A hemicube is an abstract regular polygon, containing half the faces of a full cube. A hemicube may be used when the sample location is on a solid object, such as a table, a wall, or the like. Finally, the cube, hemicube, or the like is treated as a 2-D texture containing energy information. This energy information may be used to determine which areas of the image have the most radiance, energy, contrast, or the like, thus defining the areas of interest. For example, areas of interest may be defined by areas that exceed a given threshold, areas that exceed a relative threshold, the top n areas of most energy, radiance, contrast, or the like (where n is an integer representing a cut-off value), areas within a relative distance, any combination of some or all of these metrics, or the like.

For example, an area of interest may be identified by integrating the area on the cube, hemicube, or the like. If the energy value is over a given threshold, such as 0.3 on a scale of 0-1 (with 0 being black and 1 being white), then the area may be designated as an area of interest. Alternatively, an area of interest may be identified by areas of contrast. For example, a black and white checkerboard may be an area of high contrast since each block of the checkerboard is a different color. Additional rays may be required to understand the pattern of the checkerboard and render the indirect illumination from this area correctly.

One of ordinary skill in the art will recognize there are other ways to build an importance map. For example, an importance may be built manually, by using an automated process, or by some combination of manual and automated process. Other methods, metrics, and thresholds may be used in place of, or in addition to, those described above.

In one embodiment, the point cloud used in generating the importance map may include differing densities of points for different areas within point cloud. For example, point retention in the point cloud may be biased toward areas of interest. Darker areas in the scene may be represented at lower point resolutions with points having larger point-radii to account for the larger area covered by a single micropolygon. Brighter areas may be represented at higher point resolutions. However, these areas may also be represented at the original resolution. The point cloud may be compressed before it is rasterized to the importance map.

In step 230 of process 200, the importance map informs a ray tracing engine, for example, a Monte-Carlo ray tracing engine, where the areas of interest are located. One of skill in the art will recognize that a Monte-Carlo ray tracing engine is only one type of ray tracing engine that may be used. Other types of ray tracing engines may also be used. Examples include, but are not limited to, a forward ray tracing engine, a backward ray tracing engine, a distributed ray tracing engine, a path tracing engine, or the like. The ray tracing engine may be biased based on the information provided by the importance map. For example, the ray tracing engine may only or primarily send rays toward an area of interest, may optimize for speed of computation and memory usage based on the geometry of the scene, and the like.

Figure 4:
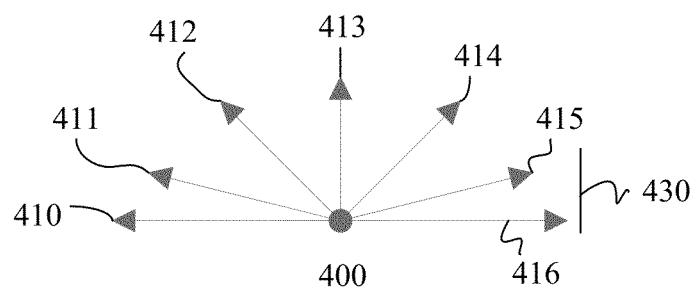
FIG. 4 illustrates an exemplary view of the results of an unbiased ray tracing engine.

FIG. 4 illustrates an exemplary representation of the results of an unbiased ray tracing engine. In this example, to determine the illumination at the sample location 400, rays 410-416 are randomly distributed in a hemisphere around the sample location 400. The distribution of the rays 410-416 is determined using stochastic sampling. These rays interact with the various objects in the scene to determine what light should be integrated into the illumination of the sample location 400.

Area 430 represents an area of interest in the scene. Area 430 may be the only area of interest in the scene. Alternatively, there may be several areas of interest in the scene. Many of the rays 410-414 are sent away from the area 430 and so contribute no energy to the final rendering of the sample location 400. Only two rays 415-416 are directed toward the area 430 and contribute energy to the final rendering of the sample location 400. Alternatively, a single ray or three or more of the rays 410-416 may be directed toward the area 430.

Figure 5A:
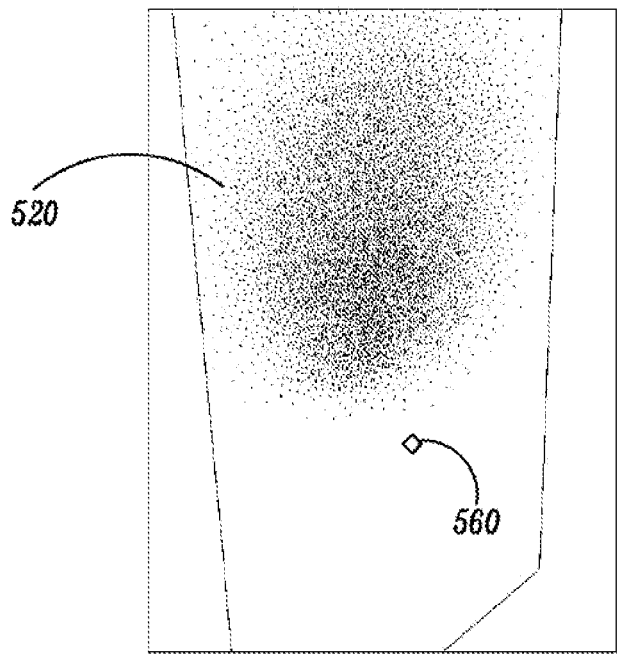
FIGS. 5A and 5B illustrate exemplary scenes with noise.

FIG. 5A illustrates an exemplary scene 500 lit by a bright patch 510 of indirect lighting and rendered using the ray tracing engine of FIG. 4. The bright patch 510 is one area of interest within the scene 500. In this example, the ray tracing engine uses a gathering process. Here, the ray tracing engine results in a noisy, or spotty, illumination 520. The spottiness 520 is due to the ray tracing engine under-sampling the bright patch 510. At each sample location in the background, either too few or no rays hit the bright patch 510, resulting in a noisy image. Such an image does not provide high quality shading or illumination from bright patch 510.

Figure 5B:
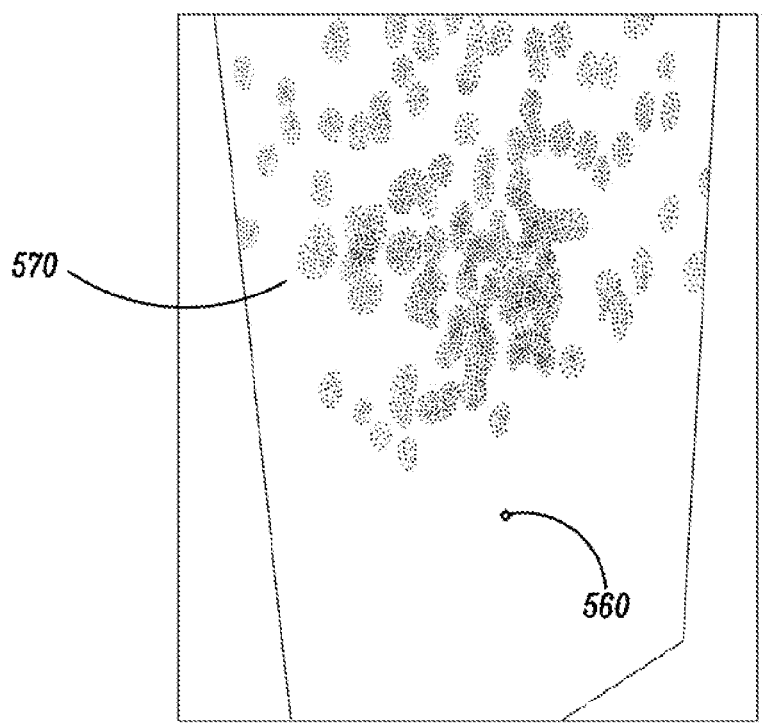

FIG. 5B illustrates an exemplary scene 550 lit by a bright patch 560 of indirect lighting. The bright patch 560 is an area of interest within the scene 550. This scene 550 may also be rendered using the ray tracing engine of FIG. 4. However, this ray tracing engine is optimized by gathering using an irradiance cache. The irradiance cache increases the speed of gathering, by storing, reusing and interpolating previously computed samples. Again, the ray tracing engine results in a noisy, or spotty, illumination 570. Caching worsens the noise problem, resulting in even larger, more obvious spottiness. The spottiness 570 is again due to the ray tracing engine under-sampling the bright patch 560. At each sample location in the background, either too few or no rays hit the bright patch 560, resulting in a noisy image.

Figure 6A:
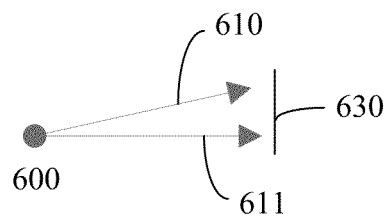
FIGS. 6A and 6B illustrate biased results of a ray tracing engine.
Figure 6B:
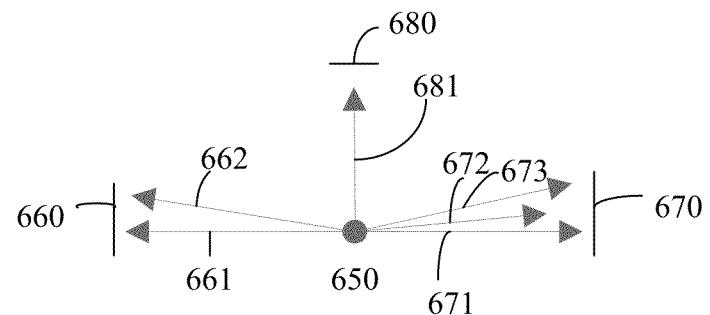

FIGS. 6A-B illustrate biased results of a ray tracing engine. In FIG. 6A, instead of randomly distributing rays in a hemisphere around the sample location 600, rays 610-611 are primarily directed toward an area of interest 630. Area 630 may be determined during a pre-computation phase for rendering the scene. For example, a point cloud representation of the scene may be determined during the pre-computation phase. From this point cloud representation, an importance map may be created. The importance map may designate area of interest 630. In this way, more rays may be directed toward the area of interest 630 without necessarily increasing the number of rays required to adequately render the scene. Fewer rays, or no rays, may be sent to the areas of non-interest in the scene, for example, areas of low energy, low information, low contrast, or the like.

FIG. 6A illustrates a single area of interest 630. Alternatively, there may be more than one area of interest. FIG. 6B illustrates another possible scene. This scene contains a sample location 650 and three areas of interest 660, 670, and 680. If there is more than one area of interest, rays may be sent to all or some of the areas of interest. Rays 661-662 are directed toward area of interest 660. Rays 671-673 are directed toward area of interest 670. Ray 681 is directed toward area of interest 680. One of ordinary skill in the art would understand that the number of areas of interest in a scene is not limited to one as exemplified in FIG. 6A or three as exemplified in FIG. 6B. There may be more or fewer areas of interest in any given scene.

Further, the number of rays directed to each area of interest need not be the same. The number of rays directed to a particular area of interest may be determined based, in whole or in part, on a number of factors, including, but not limited to size, distance, energy, radiance, randomness, or the like. In one embodiment, the total number of rays may be user-defined with the biased engine determining how many rays are used to sample each area of interest based on its importance relative to other areas in the importance map. In another embodiment, the number of rays may be defined algorithmically. For example, a minimum and maximum number of rays may be defined. For each area of interest, rays may be sent until the energy values determined from each of the rays converge to a single value. If at least a minimum number of rays have been sent, the ray tracing engine may stop sending rays toward a particular area of interest. Alternatively, if convergence is not achieved, the ray tracing engine may stop sending rays after the maximum number of rays has been sent. For example, if the area of interest has a consistent energy value, then the value may converge after the minimum number of rays. However, for areas of high contrast, such as a checkerboard, the maximum number of rays may be required since the value may not converge.

Referring to FIG. 2, in step 240 of process 200, the shading of a particular sample location is determined. Information from the biased ray tracing engine may be used alone to determine the shading for the sample location. In this embodiment, the ray tracing engine may perform secondary ray tracing operations to improve the radiance, or color, result until the scene is acceptably aesthetic. Alternatively, information from the biased ray tracing engine may be used in conjunction with a PBGI approach to determine the shading for the sample location. In this example, areas of interest may be shaded using the biased ray tracing engine. However, other areas, such as low energy areas, distant areas, or the like may be shaded using a standard PBGI approach.

Finally, in step 250 of process 200, the scene is rendered. For each shaded sample location, pixels may be rendered on the screen. Note that the scene need not be a static image. The scene may include active animation and change dynamically. For example, an object, such as an animated character, may move around within the scene.

Not all steps described in process 200 are necessary to practice an exemplary embodiment of the invention. For example, step 220 is optional. In this embodiment, the point cloud representation generated in step 210 may be used directly to bias the ray tracing engine in step 230. Although rasterization is one efficient way of integrating the point cloud, other methods may be used. For example, each point in the point cloud may be examined individually to determine its energy value.

Further, additional steps may be included. For example, when creating the importance map in step 220, areas of interest may be compressed. This compression may be achieved by finding a volume of consistent energy points. Then, points within the volume of consistent energy are removed, retaining the points at the periphery. In this way, the information is stored at the periphery of the volume and removed for the similar, internal points, reducing the amount of memory required for the importance map.

In addition, process 200 may be combined with other optimization techniques. For example, the ray tracing engine may be further biased by Bidirectional Reflectance Distribution Function (BRDF) importance sampling. A BRDF is a four-dimensional function that defines how light is reflected at an opaque surface. If little or no light is reflected from a surface, the ray tracing engine may be further biased to send fewer or no rays to that surface. For example, a black, matte object may reflect little or no light. The ray tracing engine may be biased by the BRDF to send fewer or no rays to this area. Further, the ray tracing engine may send additional rays to the overlapping areas of interest and areas of high reflectance.

Figure 7:
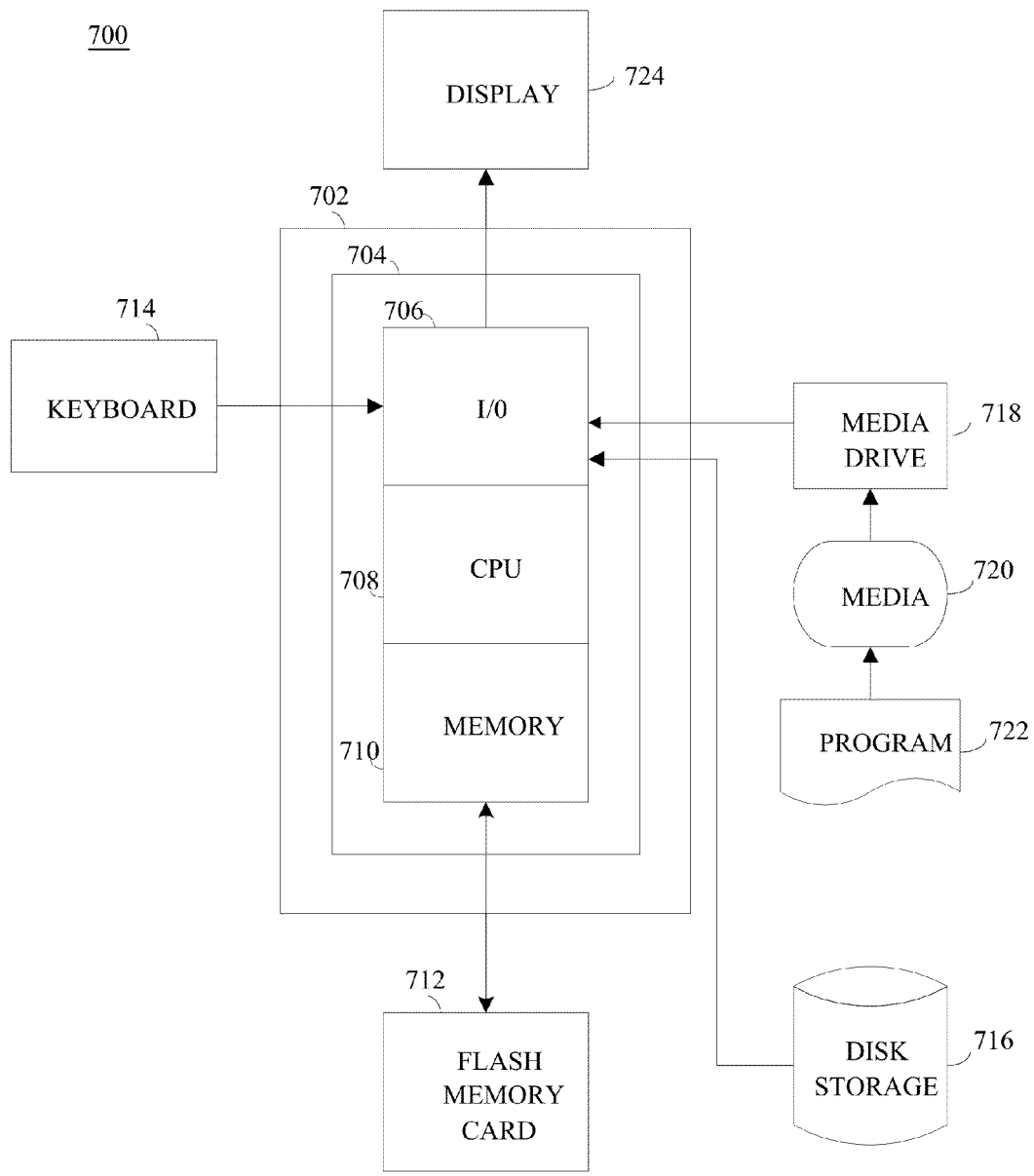
FIG. 7 illustrates an exemplary computing system.

FIG. 7 depicts an exemplary computing system 700 configured to perform any one of the above-described processes. In this context, computing system 700 may include, for example, a processor, memory, storage, and input/output devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform the above-described processes. The main system 702 includes a motherboard 704 having an input/output ("I/O") section 706, one or more central processing units ("CPU") 708, and a memory section 710, which may have a flash memory card 712 related to it. The I/O section 706 is connected to a display 724, a keyboard 714, a disk storage unit 716, and a media drive unit 718. The media drive unit 718 can read/write a computer-readable medium 720, which can contain programs 722 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, or the like) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method for shading a scene illuminated by indirect light, the scene comprising a sample location on a surface element of an object in the scene, the surface element lying at least partially within a camera viewing frustum of a virtual camera, the method comprising:
  generating a point cloud representation of the scene, wherein the point cloud representation of the scene is generated by dividing the surface of the object in the scene into one or more micropolygons and storing an energy value for each micropolygon into a point of one or more points in the point cloud;
  generating an importance map of the scene, based on the point cloud, wherein the importance map is generated by rasterizing the one or more points in the point cloud and designating an area of interest based on the energy values of the one or more points in the point cloud;
  biasing a ray tracing engine based on the importance map to calculate the path of a ray to the sample location to the area of interest; and
  shading the sample location using an output from the biased ray tracing engine.

2. The method of claim 1, wherein designating an area of interest based on the energy values of the one or more points in the point cloud further comprises:
  determining a threshold energy level, and
  designating each point in the point cloud having an energy value above the threshold energy level as an area of interest.

3. The method of claim 1, wherein generating the importance map further comprises:
  storing variable shade resolutions for each area in the scene.

4. The method of claim 3, wherein storing variable shade resolutions further comprises:
  storing fewer points for areas outside the area of interest than inside the area of interest.

5. The method of claim 3, wherein storing variable shade resolutions further comprises:
  storing more points for the area of interest than other areas.

6. The method of claim 1, wherein generating the importance map further comprises:
  compressing the area of interest.

7. The method of claim 6, wherein compressing the area of interest further comprises:
  determining a volume of points with consistent energy values, and
  removing a set of points located within the interior of the volume of points.

8. The method of claim 1, wherein shading the sample location further comprises:
  performing one or more secondary ray tracing operations using an unbiased ray tracing engine.

9. The method of claim 1, wherein shading the sample location further comprises:
  rasterizing the importance map, and
  shading the sample location in a low energy area using the rasterized importance map and a point-based global illumination approach.

10. The method of claim 1, further comprising rendering a pixel associated with the sample location.

11. The method of claim 1, wherein the scene is a dynamic scene, wherein an object moves within the dynamic scene.

12. The method of claim 1, wherein biasing the ray tracing engine further comprises:
  calculating a bidirectional reflectance distribution function to determine a reflectance value of the area of interest, and
  calculating the path of the ray to the sample location to the area of interest when the area of interest has a reflectance value above a threshold value.

13. The method of claim 1, further comprising:
  generating a second importance map of the scene, based on the point cloud, wherein the second importance map is generated by rasterizing the one or more points in the point cloud and designating another area of interest based on the energy values of the one or more points in the point cloud;
  biasing the ray tracing engine based on the second importance map to calculate the path of a second ray to a second sample location to the other area of interest; and
  shading the second sample location using a second output from the biased ray tracing engine.

14. A computer-enabled method of shading a scene illuminated by indirect light, the scene comprising a sample location on a surface element of an object in the scene, the surface element lying at least partially within a camera viewing frustum of a virtual camera, the method comprising:
  generating a point cloud representation of the scene, wherein the point cloud representation of the scene is generated by dividing the surface of the object in the scene into one or more micropolygons and storing an energy value for each micropolygon into a point of one or more points in the point cloud;
  biasing a ray tracing engine based on the point cloud representation of the scene to calculate the path of a ray to the sample location to an area of interest, wherein the area of interest is designated based on the energy values of the one or more points in the point cloud; and shading the sample location using an output from the biased ray tracing engine.

15. The method of claim 14, wherein generating a point cloud representation of the scene further comprises:
  generating an importance map of the scene, based on a point cloud, wherein the importance map is generated by rasterizing the one or more points in the point cloud.

16. The method of claim 14, wherein designating the area of interest based on the energy values of the one or more points in the point cloud further comprises:
  determining a threshold energy level, and
  designating each point in the point cloud having an energy value above the threshold energy level as an area of interest.

17. The method of claim 14, wherein shading the sample location further comprises:
  performing one or more secondary ray tracing operations using an unbiased ray tracing engine.

18. The method of claim 14, wherein biasing the ray tracing engine further comprises:
  calculating a bidirectional reflectance distribution function to determine a reflectance value of the area of interest, and
  calculating the path of the ray to the sample location to the area of interest when the area of interest has a reflectance value above a threshold value.

19. A non-transitory computer-readable storage medium comprising computer-executable instructions for shading a scene illuminated by indirect light, the scene comprising a sample location on a surface element of an object in the scene, the surface element lying at least partially within a camera viewing frustum of a virtual camera, the computer-executable instructions comprising instructions for:
  generating a point cloud representation of the scene, wherein the point cloud representation of the scene is generated by dividing the surface of the object in the scene into one or more micropolygons and storing an energy value for each micropolygon into a point of one or more points in the point cloud;

generating an importance map of the scene, based on the point cloud, wherein the importance map is generated by rasterizing the one or more points in the point cloud and designating an area of interest based on the energy values of the one or more points in the point cloud;

biasing a ray tracing engine based on the importance map to calculate the path of a ray to the sample location to the area of interest; and shading the sample location using an output from the biased ray tracing engine.

20. The non-transitory computer-readable storage medium of claim 19, wherein generating the importance map further comprises:

storing variable shade resolutions for each area in the scene.

21. The non-transitory computer-readable storage medium of claim 20, wherein storing variable shade resolutions further comprises:

storing fewer points for areas outside the area of interest than inside the area of interest.

22. The non-transitory computer-readable storage medium of claim 20, wherein storing variable shade resolutions further comprises:

storing more points for the area of interest than other areas.

23. The non-transitory computer-readable storage medium of claim 19, wherein shading the sample location further comprises:

rasterizing the importance map, and shading the sample location in a low energy area using the rasterized importance map and a point-based global illumination approach.

24. The non-transitory computer-readable storage medium of claim 19, wherein biasing the ray tracing engine further comprises:

calculating a bidirectional reflectance distribution function to determine a reflectance value of the area of interest, and calculating the path of the ray to the sample location to the area of interest when the area of interest has a reflectance value above a threshold value.

25. A computer system for shading a scene illuminated by indirect light, the scene comprising a sample location on a surface element of an object in the scene, the surface element lying at least partially within a camera viewing frustum of a virtual camera, the system comprising:

memory configured to store the sample location in the scene; and one or more processors configured to:

generate a point cloud representation of the scene, wherein the point cloud representation of the scene is generated by dividing the surface of the object in the scene into one or more micropolygons and storing an energy value for each micropolygon into a point of one or more points in the point cloud;

generate an importance map of the scene, based on a point cloud, wherein the importance map is generated by rasterizing the one or more points in the point cloud and designating an area of interest based on the energy values of the one or more points in the point cloud;

bias a ray tracing engine based on the importance map to calculate the path of a ray to the sample location to the area of interest; and shade the sample location using an output from the biased ray tracing engine.

26. The computer system of claim 25, wherein one or more processors configured to:

generate the importance map further comprises one or more processors configured to compress the area of interest.

27. The computer system of claim 26, wherein to compress the area of interest further comprises:

to determine a volume of points with consistent energy values, and to remove a set of points located within the interior of the volume of points.

28. A computer-enabled method of shading a scene illuminated by indirect light, the scene comprising a sample location on a surface element of an object in the scene, the surface element lying at least partially within a camera viewing frustum of a virtual camera, the method comprising:

biasing a ray tracing engine based on an importance map to send a ray to the sample location to an area of interest, wherein the importance map was generated, based on a point cloud, by rasterizing one or more points in the point cloud and designating the area of interest based on energy values of the one or more points in the point cloud, wherein the point cloud was generated by dividing the surface of the object in the scene into one or more micropolygons and storing the energy values for each micropolygon into a point of the one or more points in the point cloud; and shading the sample location using an output from the biased ray tracing engine.

29. The method of claim 28, further comprising:

biasing the ray tracing engine based on a second importance map to send a second ray to a second sample location to a second area of interest, wherein the second importance map was generated, based on the point cloud, by rasterizing one or more points in the point cloud and designating the second area of interest based on energy values of the one or more points in the point cloud, wherein the point cloud was generated by dividing the surface of the object in the scene into one or more micropolygons and storing the energy values for each micropolygon into a point of the one or more points in the point cloud; and shading the second sample location using a second output from the biased ray tracing engine.

* * * * *

UNITED STATES PATENT AND TRADEMARK OFFICE
CERTIFICATE OF CORRECTION

| | | |
|---|---|---|
| PATENT NO. | : 8,866,813 B2 | Page 1 of 1 |
| APPLICATION NO. | : 13/174385 | |
| DATED | : October 21, 2014 | |
| INVENTOR(S) | : Chris F. Armsden et al. | |

It is certified that error appears in the above-identified patent and that said Letters Patent is hereby corrected as shown below:

On the Title Page

On page 2, under "OTHER PUBLICATIONS", in column 1, line 1, delete ""Structuted" and insert -- "Structured --, therefor.

In the Specification

In column 4, line 45, delete "frustrum" and insert -- frustum --, therefor.

Signed and Sealed this
Fourteenth Day of July, 2015

Michelle K. Lee
*Director of the United States Patent and Trademark Office*